United States Patent
Wang et al.

(10) Patent No.: US 10,942,826 B2
(45) Date of Patent: Mar. 9, 2021

(54) METHOD AND DEVICE FOR MANAGING STORAGE SYSTEM

(71) Applicant: EMC IP Holding Company LLC, Hopkinton, MA (US)

(72) Inventors: Sheng Wang, Beijing (CN); Jian Gao, Beijing (CN); Lifeng Yang, Beijing (CN); Hongpo Gao, Beijing (CN); Chun Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 16/247,983

(22) Filed: Jan. 15, 2019

(65) Prior Publication Data

US 2019/0220376 A1    Jul. 18, 2019

(30) Foreign Application Priority Data

Jan. 18, 2018    (CN) .......................... 201810050351.1

(51) Int. Cl.
*G06F 11/20*    (2006.01)
(52) U.S. Cl.
CPC ............................... *G06F 11/2094* (2013.01)
(58) Field of Classification Search
CPC ............. G06F 11/1076; G06F 11/1092; G06F 11/2094
See application file for complete search history.

(56) References Cited

U.S. PATENT DOCUMENTS

| | | | | |
|---|---|---|---|---|
| 6,959,413 B2 * | 10/2005 | Humlicek | ........... | G06F 11/1092 711/114 |
| 7,549,112 B2 * | 6/2009 | Terry | ................. | G06F 11/1092 714/5.11 |
| 7,809,979 B2 * | 10/2010 | Mochizuki | .......... | G06F 11/1092 714/38.14 |
| 8,819,522 B2 * | 8/2014 | Baba | .................... | G06F 11/1092 714/770 |
| 9,053,075 B2 * | 6/2015 | Watanabe | ........... | G06F 11/1092 |
| 9,081,752 B2 | 7/2015 | Aliev et al. | | |
| 9,304,859 B2 | 4/2016 | Aliev et al. | | |
| 9,354,975 B2 | 5/2016 | Aliev et al. | | |
| 9,507,535 B2 | 11/2016 | Aliev et al. | | |
| 9,804,939 B1 | 10/2017 | Bono et al. | | |
| 10,210,045 B1 | 2/2019 | Gao et al. | | |
| 10,289,336 B1 | 5/2019 | Liu et al. | | |
| 10,459,814 B2 | 10/2019 | Gao et al. | | |
| 10,552,078 B2 | 2/2020 | Gong et al. | | |
| 2005/0081088 A1 * | 4/2005 | Tanaka | ................ | G06F 11/1076 714/5.1 |

* cited by examiner

*Primary Examiner* — Joseph R Kudirka
(74) *Attorney, Agent, or Firm* — BainwoodHuang

(57) ABSTRACT

Techniques manage a storage system comprising a group of storage devices. The techniques involve: determining from the group of storage devices a first storage device which is in a rebuilding state; in response to a second storage device in the group of storage devices failing, obtaining a recoverability indication indicating whether a data block in the second storage device, which corresponds to a target data block in the first storage device, is recoverable or not on the basis of a data state of the target data block; and recovering data in the data block in the second storage device corresponding to the target data block on the basis of the recoverability indication.

21 Claims, 10 Drawing Sheets

METHOD AND DEVICE FOR MANAGING STORAGE SYSTEM

FIELD

Various implementations of the present disclosure relate to storage management, and more specifically, to a method and apparatus for managing a storage system (e.g. Redundant Array of Independent Disks (RAID)), as well as a computer program product.

BACKGROUND

With the development of data storage techniques, various data storage devices now provide users with higher and higher data storage capacity, and also their data access speed has been increased greatly. With the increase of data storage capacity, users also impose greater demands on data reliability and response time of storage systems. So far various data storage systems based on redundant arrays of disks have been developed for improving reliability of data. When one or more disks in a storage system fail(s), data in failed disk(s) can be recovered from other normal disk.

Regarding multiple extents in one stripe of the mapped RAID, they may be distributed over different storage devices, so that when a physical storage device where one extent among the multiple extents resides fails, data may be recovered from a physical storage device where other extent resides. For RAID, there may be provided different security levels. At a lower security level (e.g. RAID-5), parity data may be stored using less space (e.g. only P parity is stored), while at a higher security level (e.g. RAID-6), more space is required in order to store parity data (e.g. P parity and Q parity).

Storage systems at different security levels allow different numbers of storage devices to fail. For a 4D+1P (where 4D represents that 4 storage devices are included in the storage system for storing data, and 1P represents that 1 storage device is included in the storage system for storing parity) RAID-5 storage system, it is acceptable for 1 storage device to fail. However, where 2 devices in the RAID-5 storage system fail, at this point the storage system is unable to recover data in failed storage devices, and further data loss is caused. To guarantee the normal operation of the storage system, technical professional are needed to perform specific recovery operation for processing failures in the above 2 devices. At this point, how to perform recovery operation easily and effectively becomes a tough issue.

SUMMARY

Therefore, it is desirable to develop and implement a technical solution for managing a storage system more easily and reliably. It is desired that the technical solution can be compatible with existing storage systems and manage data in existing storage systems more reliably by changing various configurations of these storage systems.

According to a first aspect of the present disclosure, there is provided a method for managing a storage system, the storage system including a group of storage devices. The method includes: determining from the group of storage devices a first storage device which is in a rebuilding state; in response to a second storage device in the group of storage devices failing, obtaining a recoverability indication indicating whether a data block in the second storage device, which corresponds to a target data block in the first storage device, is recoverable or not on the basis of a data state of the target data block; and recovering data in the data block in the second storage device corresponding to the target data block on the basis of the recoverability indication.

According to a second aspect of the present disclosure, there is provided an apparatus for managing a storage system. The apparatus includes: one or more processors; a memory coupled to at least one processor of the one or more processors; computer program instructions stored in the memory which, when executed by the at least one processor, cause the apparatus to execute a method for managing a storage system. The method includes: determining from the group of storage devices a first storage device which is in a rebuilding state; in response to a second storage device in the group of storage devices failing, obtaining a recoverability indication indicating whether a data block in the second storage device, which corresponds to a target data block in the first storage device, is recoverable or not on the basis of a data state of the target data block; and recovering data in the data block in the second storage device corresponding to the target data block on the basis of the recoverability indication.

According to a third aspect of the present disclosure, there is provided a computer program product being tangibly stored on a non-transient computer readable medium and including machine executable instructions for executing actions of a method according to the present disclosure.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
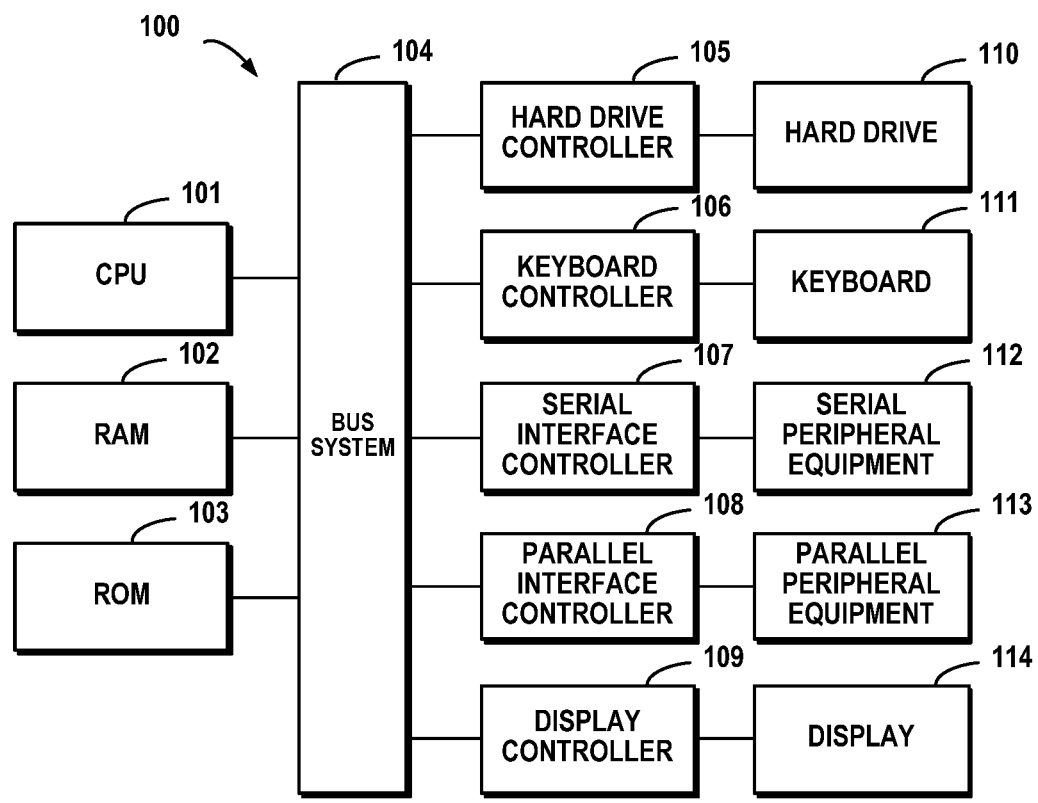
FIG. 1 schematically illustrates a block diagram of an example computer system which is applicable to implement the implementations of the present disclosure.

FIG. 1 illustrates an example computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only by way of example rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) combines multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wikiNested_RAID_levels, etc.

Figure 2A:
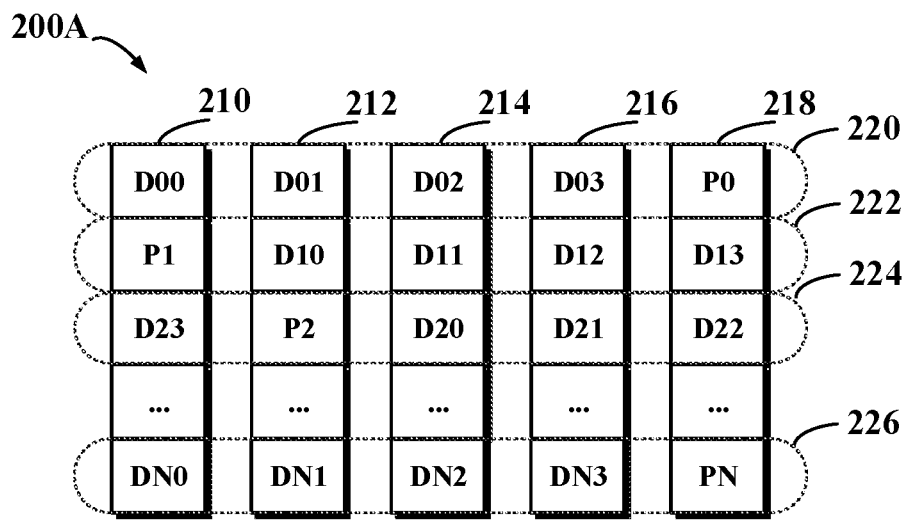
FIGS. 2A and 2B each schematically illustrate a view of an application environment where the implementations of the present disclosure may be implemented.

FIG. 2A schematically illustrates a schematic view 200A of a structure of RAID according to one technical solution. In this figure, working principles of RAID are illustrated by taking RAID-5 (4D+1P, where 4D represents that 4 storage devices are included in the storage system for storing data, and 1P represents that 1 storage device is included in the storage system for storing parity) that includes five independent storage devices (210, 212, 214, 216 and 218) as an example. It should be noted although five storage devices are schematically shown in FIG. 2A, in other implementations more or less storage devices may be included according to different levels of RAID. Moreover, although in FIG. 2A there are shown stripes 220, 222, 224, . . . 226, in other examples the RAID system may further include a different number of stripes.

In RAID, a stripe crosses multiple physical storage devices (for example, the stripe 220 crosses storage the devices 210, 212, 214, 216 and 218). The stripe may be simply construed as a storage area among multiple storage devices which satisfies a given address range. Data stored in the stripe 220 includes multiple parts: a data block D00 stored in the storage device 210, a data block D01 stored in the storage device 212, a data block D02 stored in the storage device 214, a data block D03 stored in the storage device 216, and a data block P0 stored in the storage device 218. In this example, data blocks D00, D01, D02 and D03 are stored data, and data block P0 is a P parity of the stored data.

The mode of storing data in other stripes 222 and 224 is similar to that in the stripe 220, and the difference is that the parity about other data block may be stored in other storage device than the storage device 218. In this way, when one of the multiple storage devices 210, 212, 214, 216 and 218 fails, data in the failed device may be recovered from other normal storage devices.

Figure 2B:
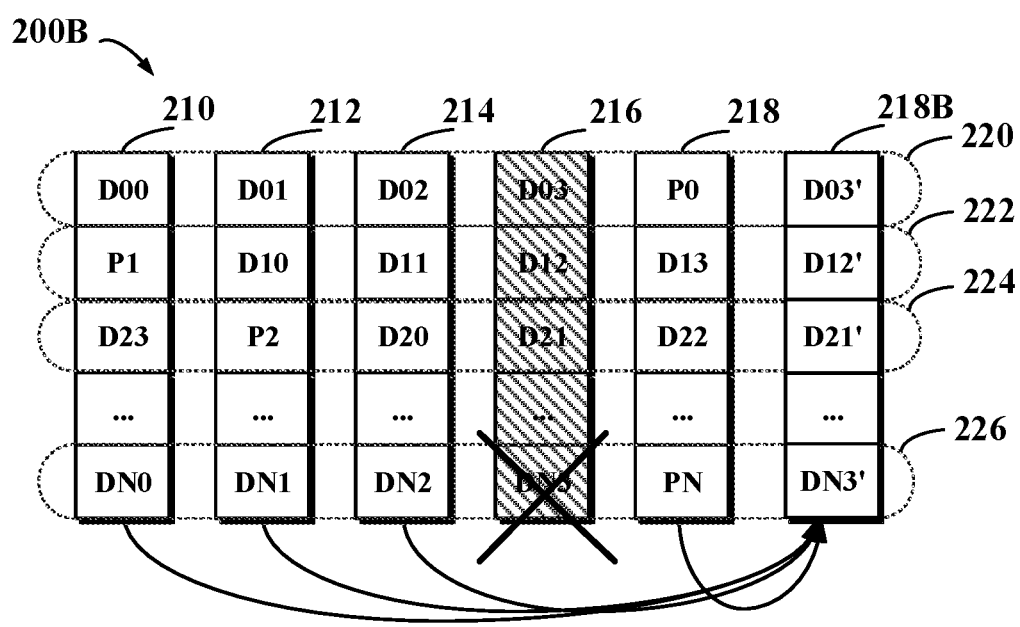

FIG. 2B schematically illustrates a schematic view 220B of rebuilding process of RAID according to one technical solution. As shown in FIG. 2B, when one storage device (e.g. the storage device 216 shown in shades) fails, data may be recovered from the other storage devices 210, 212, 214 and 218 that operate normally. At this point, a new standby storage device 218B may be added to RAID to replace the storage device 218. In this way, recovered data may be written to 218B, and system rebuilding may be realized.

While a RAID-5 storage system including 5 storage devices (among which 4 storage devices are used for storing data and 1 storage device is used for storing parity) has been described with reference to FIGS. 2A and 2B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Note throughout the context of the present invention, a 4D+1P RAID-5 storage system is taken as an example of a storage system including multiple storage devices. When other RAID level is used, those skilled in the art may implement concrete details based on the above described principles. For example, in a 4+2 RAID-6 storage system, 4 storage devices are used for storing data, and 2 storage devices are used for storing parity. In a 4+3 triple-parity RAID, 4 storage devices are used for storing data, and 3 storage devices are used for storing parity.

During the operation of the RAID-5 storage system, two storage devices might fail (this case is called "double failures"). Usually, it is considered data in the storage system has been corrupted and cannot be rebuilt. At this point, technical professionals must be hired to perform professional operation for recovering corrupted data in the storage system. However, on the one hand, hiring technical professionals will lead to an extra financial burden; on the other hand, as time elapses, the state of failed devices might further deteriorate, and then data in the double failed storage system is further corrupted.

To solve the foregoing drawbacks, implementations of the present disclosure provide a method, apparatus and program product for managing a storage system. Specifically, according to one implementation of the present disclosure, provided is a technical solution for managing a storage system. A case might arise as below: data in the two failed storage devices might have not been completely corrupted, but perhaps a part of data may be read. At this point, recovery may be performed without external technical professionals.

The technical solution according to an example implementation of the present disclosure is particularly applicable to the following application scenarios. Scenario 1: a first storage device in the storage system goes offline (i.e. the storage system is unable to access data in the first storage device), the going offline of the first storage device triggers rebuilding operation of the storage system, and a second storage device fails during the rebuilding operation. Scenario 2: a first storage device in the storage system fails, the failure in the first storage device triggers rebuilding operation of the storage system, and further a second storage device fails during the rebuilding operation.

Figure 3:
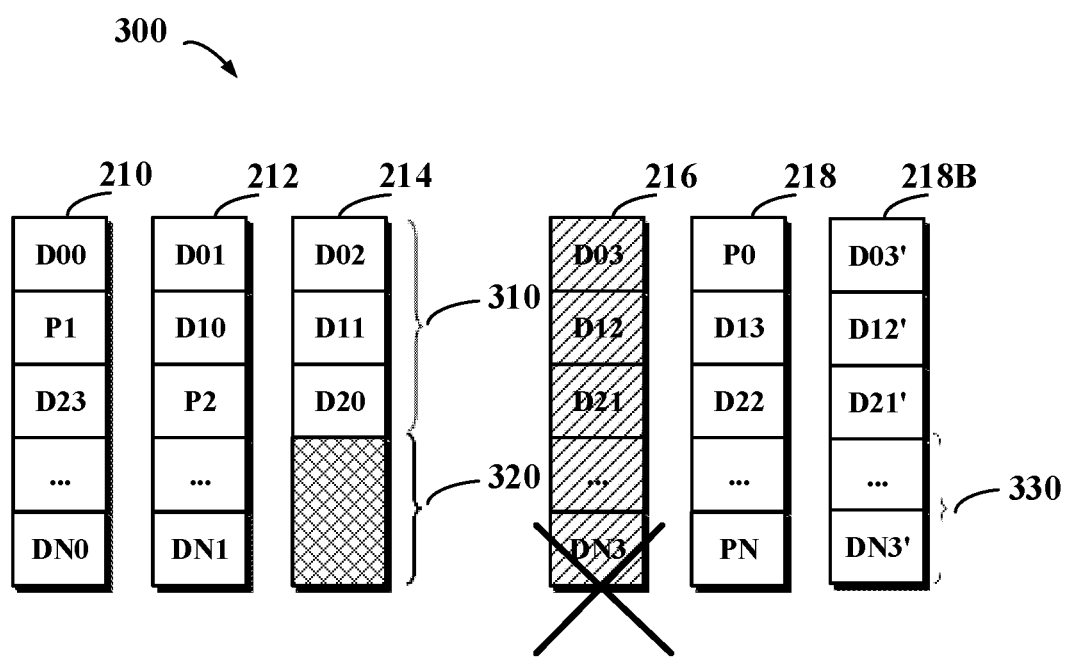
FIG. 3 schematically illustrates a block diagram of a technical solution for managing a storage system according to an example implementation of the present disclosure.

FIG. 3 schematically shows a block diagram of a technical solution 300 for managing a storage system according to an example implementation of the present disclosure. As depicted, the storage system includes a group of storage devices 210, 212, 214, 216 and 218. At this point, a first storage device 214 in rebuilding state may be first determined (or ascertained) from the group of storage devices. It will be appreciated the first storage device 214 is currently in rebuilding state, and a data portion 310 has been rebuilt while a data portion 320 has not been rebuilt. At this point, the data portion 310 stores normal data. Here "being normal" refers to data contents in the target data block are consistent with data contents in the target data block when the storage system is in normal state and do not need to be rebuilt. The data portion 320 stores "abnormal" data, i.e. meaning this portion needs to be rebuilt.

While the first storage device 214 is rebuilt, a second storage device 216 might fail. At this point, in response to the second storage device 216 in the group of storage devices failing, a recoverability indication indicating whether a data block in the second storage device 216 corresponding to a target data block in the first storage device 214 is recoverable or not may be determined on the basis of a data state of the target data block. It will be appreciated the target data block here may refer to any data block in the first storage device 214. Further, based on the recoverability indication, data in data blocks in the second storage device corresponding to target data blocks is recovered by processing the respective data blocks one by one. It will be noted "recover" here is a broad concept: if it is determined on the basis of the recoverability indication that data is recoverable, then data recovery is performed; if it is determined on the basis of the recoverability indication that data is unrecoverable, then the data being unrecoverable is notified, or further technical professionals are notified to perform professional recovery operation, etc.

Here data in the failed second storage device 216 may be recovered to a standby storage device 218B. As shown in FIG. 3, suppose all target data blocks in the first storage device 214 are in normal state, although the first storage device 214 is being rebuilt, data in various extents in the second storage device 216 may be recovered on the basis of data in the target data blocks D02, D11 and D20 that are in normal state as well as data in the other normal storage devices 210, 212 and 218, and further recovered data may be written to the standby storage device 218B. Specifically, regarding the target data block D02 in the first storage device 214, data in the failed second storage device 216 may be recovered on the basis of various data blocks D00, D01, D02 and P0 in a stripe where the target data block D02 resides, and further recovered data may be written to a data block D03' in the standby storage device 218B.

For a traditional 4D+1P storage system, when there exist two failed storage devices in the storage system, it cannot be rebuilt independently but needs to be fixed by technical professionals. As compared with a traditional technical solution, the example implementation of the present disclosure may allow at least a part of data to be recovered from the storage system where two failed storage devices exist. According to the example implementation of the present disclosure, during a rebuild of the storage system, when the second storage device 216 in the storage system fails, as many data blocks as possible may be recovered from the first storage device 214 that is being rebuilt, without the assistance of technical professionals.

Further, when one or more storage devices in the storage system fail, if data in the storage system cannot be rescued in time, as time elapses, the failure situation of the storage system might deteriorate, which further leads to a complete crash of the storage system and unrecoverable data. According to the example implementation of the present disclosure, early when it is detected that the second storage device 216 fails, the recovery process may be immediately initiated, and further it may be guaranteed more data may be recovered from the storage system.

Figure 4:
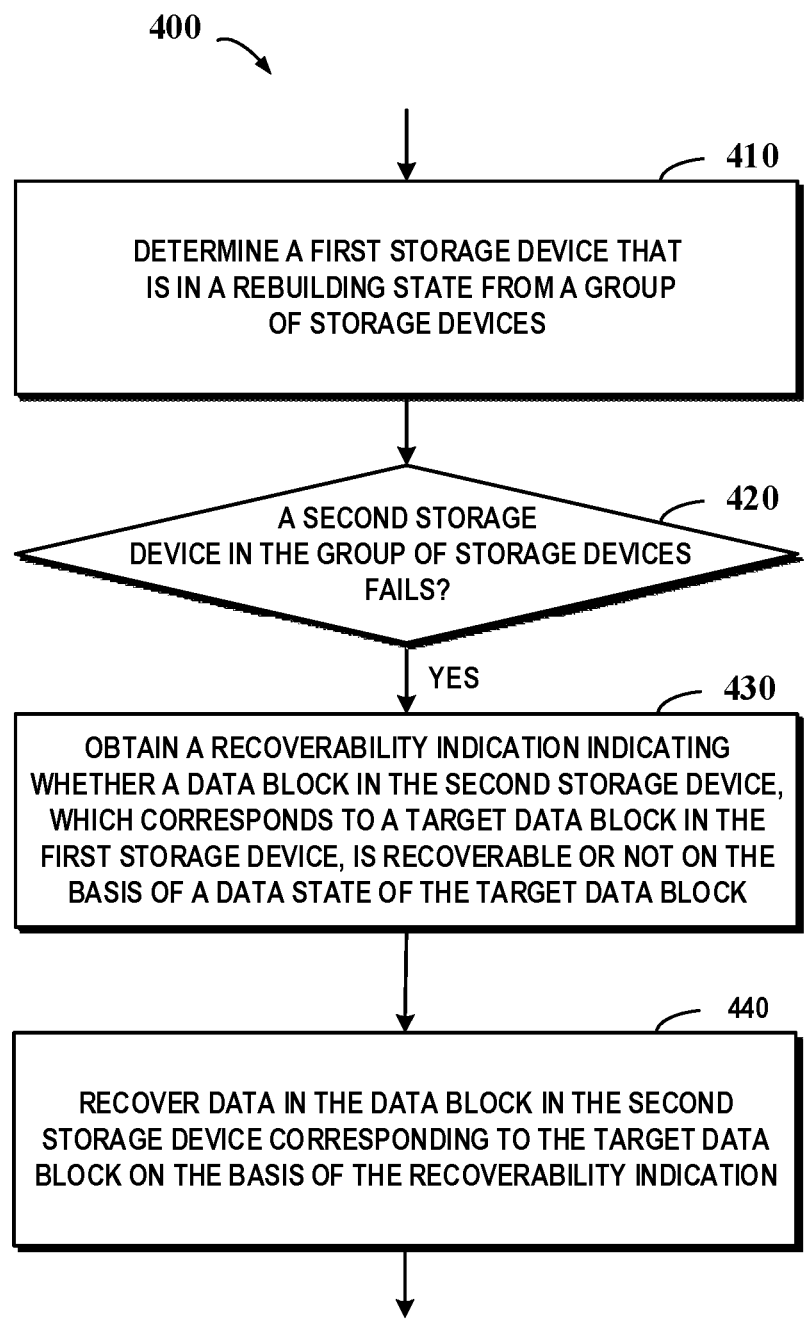
FIG. 4 schematically illustrates a flowchart of a method for managing a storage system according to an example implementation of the present disclosure.

With reference to FIGS. 4 to 10B, a detailed description is presented below to more details for managing a storage system. FIG. 4 schematically shows a flowchart of a method 400 for managing a storage system according to an example implementation of the present disclosure. Specifically, in block 410, a first storage device 214 which is in a rebuilding state is determined from a group of storage devices. In this example implementation, information regarding which storage device is being rebuilt may be obtained from a controller of the storage system.

In block 420, it is judged whether a second storage device 216 in the group of storage devices fails or not. If the judgment result is "yes," then in block 430, a recoverability indication indicating whether a data block in the second storage device, which corresponds to a target data block in the first storage device, is recoverable or not is determined on the basis of a data state of the target data block. In this example implementation, the recoverability indication may include multiple types, namely "unallocated," "recoverable" and "unrecoverable." In block 440, data in the data block corresponding to the target data block in the second storage device is recovered on the basis of the recoverability indication. In accordance with certain embodiments, such indicators may take the form of parameters, identifiers, values, etc. that uniquely identify the particular types.

With reference to the accompanying drawings, a detailed description is presented below to how to determine the recoverability indication. According to the example implementation of the present disclosure, in order to determine the recoverability indication, if an allocation state indicates the target data block has not been allocated, then the recoverability indication is set to "unallocated." In this example implementation, the storage device might include data blocks which have not been allocated to users. Thereby, for these unallocated data blocks, they may be identified so that during subsequent recovery, they may be skipped in order to increase the efficiency of the recovery process, or they may be processed specially in order to meet customized demands.

Figure 5:
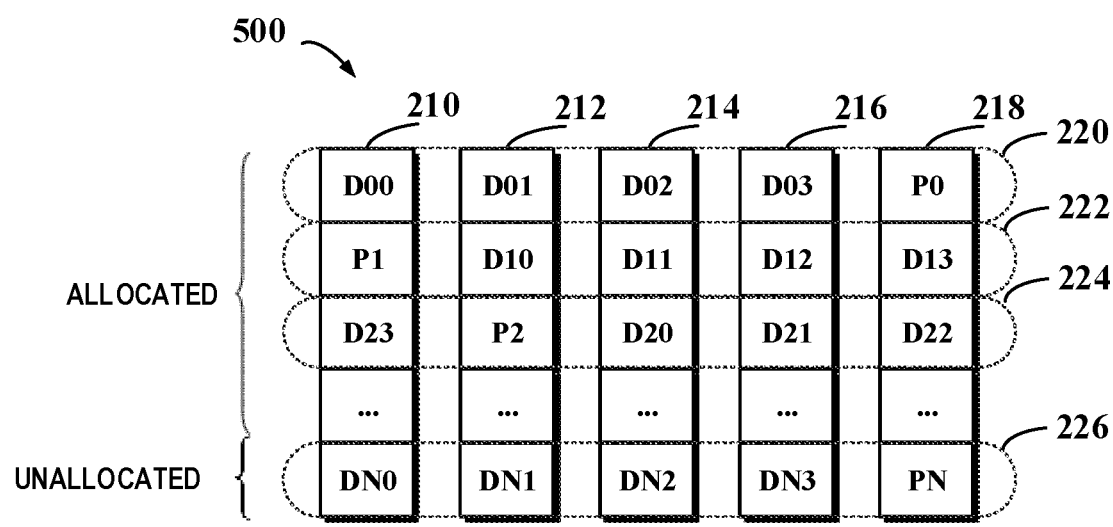
FIG. 5 schematically illustrates a block diagram of an allocated portion and an unallocated portion in a storage system according to an example implementation of the present disclosure.

FIG. 5 schematically shows a block diagram 500 of an allocated portion and an unallocated portion in a storage system according to an example implementation of the present disclosure. As depicted, the storage system may include stripes 220, 222, 224, . . . , 226. However, not all of the stripes have been allocated to users of the storage system. Specifically, the stripes 220, 222 and 224 have been allocated to users, whereas the last stripe 226 shown in FIG. 5 has not been allocated to a user. At this point, data blocks in the stripe 226 do not need to be recovered, but only data blocks in the stripes 220, 222 and 224 are considered. According to the example implementation of the present disclosure, a state regarding whether each stripe has been allocated or not may be looked up in records of the storage system, and then the recoverability indication may be determined on the basis of the state.

According to an example implementation of the present disclosure, in response to the recoverability indication being set to "unallocated," predefined data is written to a data block corresponding to the target data block in the second storage device, so as to indicate the data block has not been allocated. In this example implementation, a data field for indicating a data block has not been allocated may be defined in advance. For example, a value "1" or other value in the hexadecimal form may be continuously written to the data block.

By writing predefined data to an "unallocated" data block, technical professionals may conveniently perform further processing later. For example, when a technical professional detects the continuous predefined data appears in the storage system, it may be learned a stripe where the "unallocated" data block resides has not been allocated to a user. Hence, this stripe may be skipped so as to increase the efficiency of subsequent recovery operation.

According to an example implementation of the present disclosure, the data state may include an associated state, which may indicate whether data in the target data block is associated with data in a corresponding data block in a further storage device in the group of storage devices or not. At this point, in response to the allocation state indicating the target data block has been allocated, the recoverability indication may be determined on the basis of the associated state.

In this example implementation, a target data block which is marked as "unallocated" may be skipped, and subsequent operation is only performed to an allocated target data block so as to increase the processing efficiency. Further, the associated state indicates whether data in the target data block needs to be rebuilt or not, and whether data in the target data block is normal data or not may be judged from the associated state. In subsequent operation, it may be determined on the basis of the associated state whether data in the target data block is "normal" or not.

In a storage system running normally, usually data in various data blocks in one stripe should be associated with one another. Nevertheless, such a case might arise: in scenario 1 described above, for example, a first storage device in the storage system goes offline (i.e. the storage system cannot access data in the first storage device), at which point a data block in a storage device is modified and further various data blocks in the stripe need to be rebuilt. It may be considered data in various data blocks in the stripe is not associated with one another. In other words, at this point data in the stripe is "dirty" data which has not been updated, and thus data needs to be rebuilt.

According to an example implementation of the present disclosure, the recoverability indication may be determined on the basis of the associated state. Specifically, if the associated state indicates data in the target data block does not need to be rebuilt, then the recoverability indication may be set to "recoverable." If the associated state indicates data in the target data block needs to be rebuilt, then the recoverability indication may be set to "unrecoverable."

According to an example implementation of the present disclosure, the first storage device includes metadata, the metadata indicating whether an extent among multiple extents in the first storage device needs to be rebuilt or not. At this point, the recoverability indication may be determined on the basis of the metadata. In this example implementation, whether data in the target data block needs to be rebuilt or not may be conveniently judged on the basis of content of metadata in each storage device in the storage system.

Figure 6:
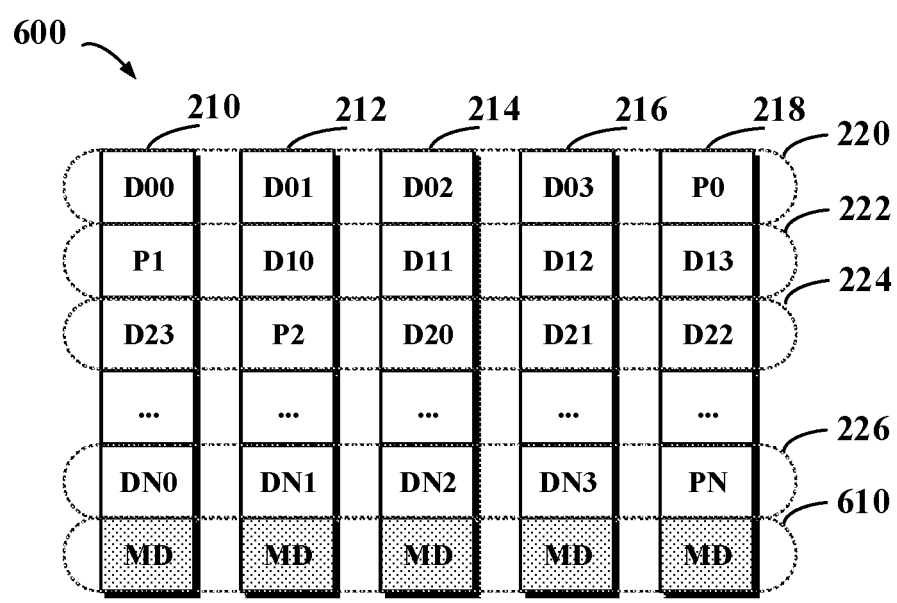
FIG. 6 schematically illustrates a block diagram of metadata in a group of storage devices in a storage system according to an example implementation of the present disclosure.

FIG. 6 schematically shows a block diagram 600 of metadata in a group of storage devices in a storage system according to an example implementation of the present disclosure. In each storage device in the storage system as shown in FIG. 6, there may exist a dedicated portion 610 for storing metadata. By reading content of the metadata, it may be determined whether data in the target data block needs to be rebuilt or not.

Figure 7:
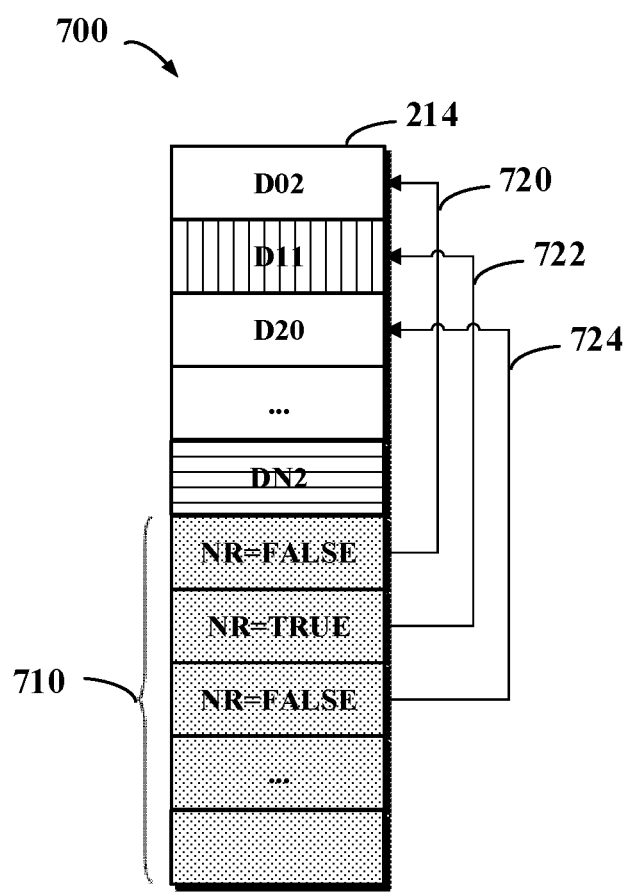
FIG. 7 schematically illustrates a block diagram of correspondences between data blocks and metadata in a storage device according to an example implementation of the present disclosure.

FIG. 7 schematically shows a block diagram 700 of correspondences between data blocks and metadata in a storage device according to an example implementation of the present disclosure. It will be appreciated FIG. 7 only shows correspondences in one storage device, the correspondences described here may be further applicable to other storage device. With reference to FIG. 7, a reference numeral 710 shows the distribution of target data blocks and metadata in a first storage device 214. Specifically, the first storage device 214 may include multiple target data blocks D02, D11, D20, . . . , DN2. Further, the first storage device 214 may include a metadata portion 710, and the metadata portion 710 may include metadata corresponding to the various target data blocks D02, D11, D20, . . . , DN2 respectively.

Specifically, as shown by an arrow 720, "NR=FALSE" (i.e. Need Rebuild=False) in the metadata portion 710 represents data in the target data block D02 does not need to be rebuilt, i.e. representing data in the target data block D02 is "normal." Further, as shown by an arrow 722, "NR=TRUE" (i.e. Need Rebuild=True) in the metadata portion 710 represents data in the target data block needs to be rebuilt, i.e. representing data in the target data block D11 is "abnormal." As shown by an arrow 724, "NR=FALSE" (i.e. Need Rebuild=False) in the metadata portion 710 represents data in the target data block D20 does not need to be rebuilt, i.e. representing data in the target data block D20 is "normal." According to the example implementation of the present disclosure, if metadata is "NR=FALSE," then the recoverability indication may be set to "recoverable;" if metadata is "NR=TRUE," then the recoverability indication may be set to "unrecoverable."

According to an example implementation of the present disclosure, in response to the target data block being unreadable, the recoverability indication is set to "unrecoverable." In this example implementation, if the format of a target data block differs from a normal format which a data block in the storage system is supposed to have, and further the target data block is caused to be unreadable, then at this point the operation of reading metadata as described in this disclosure may be skipped, and the recoverability indication is directly set to "unrecoverable." In this manner, unnecessary processing steps may be skipped and the processing efficiency is increased. For example, suppose data in a target data block is completely corrupted (e.g. garbled), then at this point the recoverability indication of the target data block may be set to "unrecoverable."

Where the recoverability indication has been determined, specific content of the recoverability indication may be followed so as to perform a recovery step accordingly. According to an example implementation of the present disclosure, if the recovery mark indicates "recoverable," data in the data block corresponding to the target data block in the second storage device is recovered on the basis of data in the target data block and data in a data block corresponding to the target data block in the group of storage devices. In this example implementation, recovery operation is performed only to a data block associated with the "recoverable" target data block, while other data blocks associated with "unallocated" or "unrecoverable" target data blocks may be skipped so as to increase the recovery efficiency.

It will be appreciated for a data block associated with the "unallocated" target data block, even if corrupted data in the second storage device 261 can be recovered on the basis of existing data in the storage system, the recovered data is useless to users of the storage system. It will be further appreciated for a data block associated with the "unrecoverable" target data block, even if corrupted data in the second storage device 261 is recovered on the basis of existing data in the storage system, recovered data is not "normal" data to users of the storage system. Therefore, the recovery operation only needs to be performed to a data block associated with the "recoverable" target data block.

According to an example implementation of the present disclosure, in response to the recovery mark indicating "unrecoverable," a notification may be sent to administrators of the storage system so as to indicate data in a data block cannot be recovered in the way according to the present disclosure. In this example implementation, a data field for indicating a data block is "unrecoverable" may be defined in advance. For example, a predefined identifier may be used. Based on the predefined identifier, technical professionals may conveniently perform further processing later. For example, when a technical professional detects the predefined identifier appears in the storage system, a specific position of a stripe where the "unrecoverable" data block resides may be learned. Subsequently, the technical professional may perform specialized recovery operation to data in the stripe only. For example, the technical professional may use a hard disk recovery tool to scan the stripe, so as to recover data therein.

According to an example implementation of the present disclosure, a further recoverability indication indicating whether a data block in the second storage device, which corresponds to a further target data block in the first storage device, is recoverable or not may be determined on the basis of a data state of the further target data block; and data in the data block corresponding to the further target data block in the second storage device may be recovered on the basis of the further recoverability indication. According to the example implementation of the present disclosure, the first storage device 214 being rebuilt currently may include multiple target data blocks, at which point each of the target data blocks needs to be processed. In this manner, as much data as possible may be recovered from the storage system.

In this example implementation, a data state of each of the target data blocks in the first storage device 214 may be determined by the method described above, and further a recoverability indication indicating whether a data block corresponding to each of the target data blocks in the second storage device 216 is recoverable or not may be determined. Further, recovery may be performed accordingly using the method described above.

According to an example implementation of the present disclosure, a group including recoverable data blocks and a group including unrecoverable data blocks may be established respectively according to types of recoverability indications. In this manner, "recoverable" and "unrecoverable" target data blocks may be differentiated conveniently, the "recoverable"/"unrecoverable" groups may be processed collectively, and further the efficiency of the recovery operation may be increased.

In one implementation, various data blocks in the first storage device 214 may be processed separately, and they may be placed in different groups. Specifically, the target data block and the further target data block are added to a first group. Then, a target data block which has not been allocated to a user of the storage system is removed from the first group. Next, at least one portion of the first group are moved to a second group, so that a recoverability indication of a target data block in the first group differs from a recoverability indication of a target data block in the second group. Finally, data in data blocks in the second storage device, which correspond to the target data block and the further target data block, is recovered on the basis of the first group and the second group. A detailed description is presented below to a specific example regarding how to establish different groups on the basis of recoverability indications.

Figure 8A:
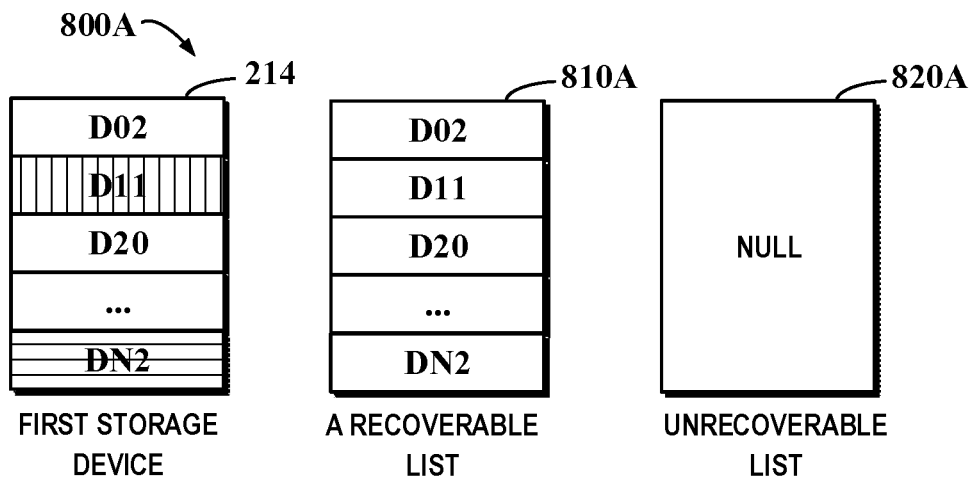
FIGS. 8A, 8B and 8C each schematically illustrate a block diagram of a technical solution for managing a storage system according to an example implementation of the present disclosure.
Figure 8B:
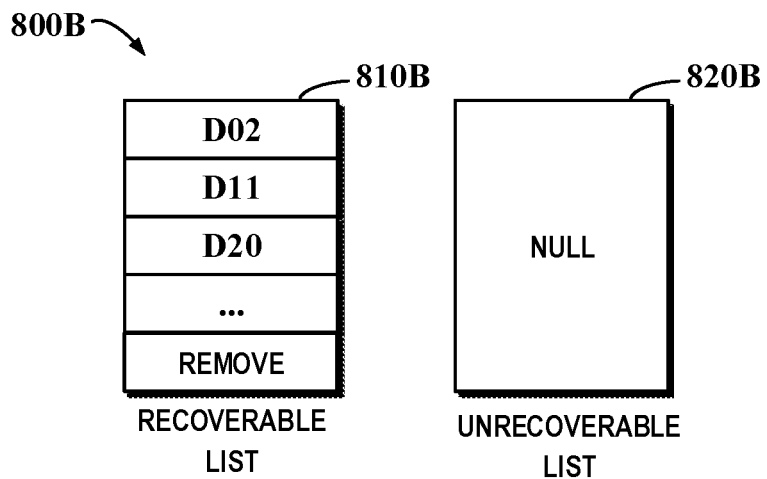
Figure 8C:
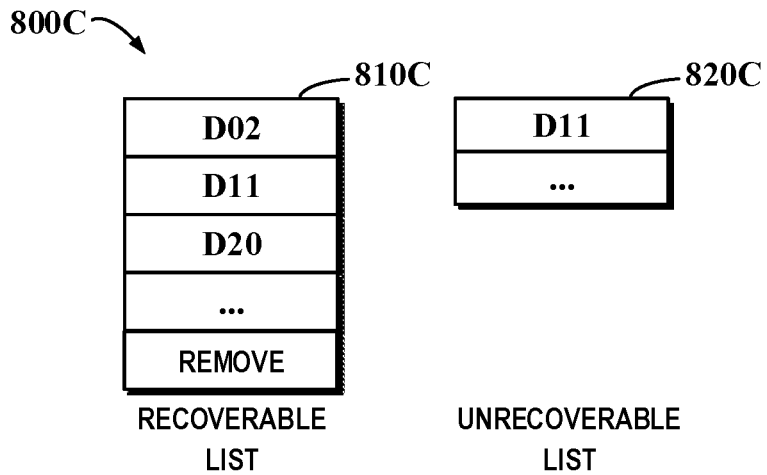

FIGS. 8A, 8B and 8C schematically show block diagrams 800A, 800B and 800C of a technical solution for managing a storage system according to an example implementation of the present disclosure respectively. FIG. 8A shows multiple target data blocks included in the first storage device 214. In this example implementation, a recoverable list 810A and an unrecoverable list 820A may be provided. Specifically, initially indications of all target data blocks in the first storage device 214 may be added to the recoverable list, at which point the unrecoverable list 820A is null.

Next, target data blocks whose recoverability indications are "unallocated" may first be removed from the recoverable list 810A, so as to form a recoverable list 810B as shown in FIG. 8B. Then, according to the above described method, the recoverability indication of each target data block in the recoverable list 810B may be judged. If the recoverability indication is "recoverable," then the target data block is kept in the recoverable list 810B; if the recoverability indication is "unrecoverable," then the target data block is moved to an unrecoverable list 820B. After processing to each target data block is completed, two lists may be as shown in FIG. 8C.

It will be appreciated although an example of only dividing various target data blocks in the first storage device 214 to a recoverable list and an unrecoverable list has been described above, according to an example implementation of the present disclosure, data blocks in the second storage device 216 may also be divided into a recoverable list and an unrecoverable list. Further, in examples as shown in FIGS. 8A to 8C, first various data blocks may first be added to the unrecoverable list, and recoverable data blocks in the list 820A may be moved to the recoverable list.

Figure 9:
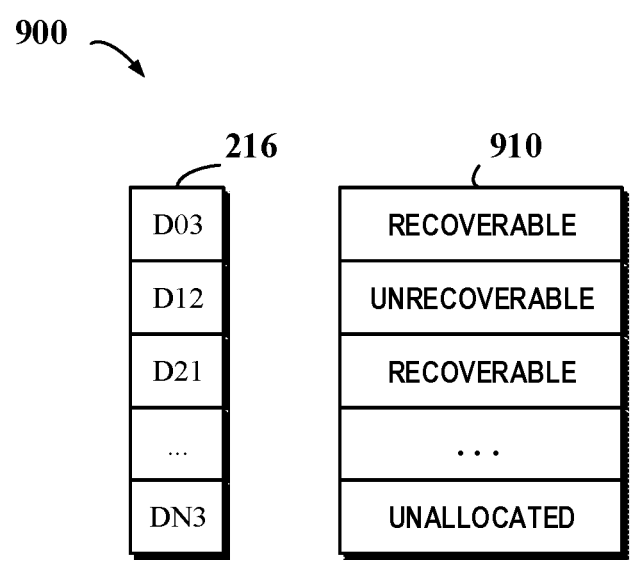
FIG. 9 schematically illustrates a block diagram for a second storage device in a storage system according to an example implementation of the present disclosure.

FIG. 9 schematically shows a block diagram 900 for a second storage device in a storage system according to an example implementation of the present disclosure. Where it has been determined if each data block in the second storage device 216 is recoverable, each data block in the second storage device 216 may be marked as shown in a list 910. Subsequently, various extents in the second storage device 216 may be recovered according to the mark 910.

Figure 10A:
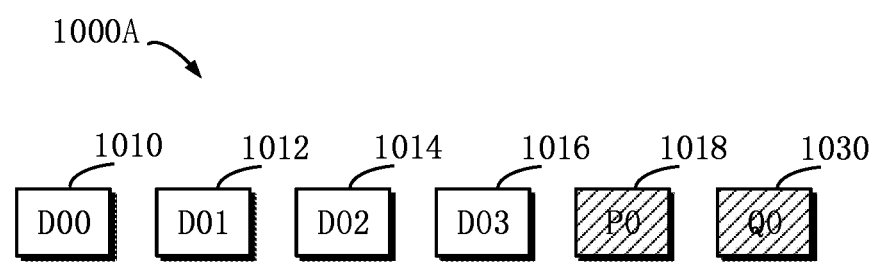
FIGS. 10A and 10B schematically show block diagrams for managing a RAID-6 storage system and a triple-parity storage system according to an example implementation of the present disclosure respectively.
Figure 10B:
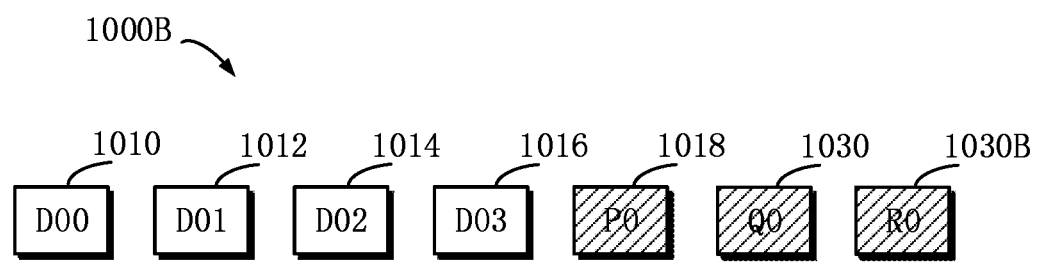

Concrete steps of how to manage a storage system have been described by taking 4D+1P RAID-5 as an example. It will be appreciated the example implementations of the present disclosure may be further applicable to a storage system at other security level. With reference to FIGS. 10A and 10B, a general description is presented below to operations in a 4D+2P RAID-6 storage system and a 4D+3P triple-parity storage system.

FIG. 10A schematically shows a block diagram 1000A of a technical solution for managing a RAID-6 storage system according to an example implementation of the present disclosure. For the purpose of brevity, FIG. 10A shows only one stripe in the storage system, the stripe including data blocks 1010, 1012, 1014, 1016, 1018 and 1030. In this stripe, the data blocks 1010, 1012, 1014 and 1016 are used for storing data D00, D01, D02 and D03 respectively, and the data blocks 1018 and 1030 are used for storing parity P0 and Q0 respectively.

Suppose a storage device where the data block 1014 resides is being rebuilt, and it is also found storage devices where the data blocks 1018 and 1030 fail. At this point, whether data in the data blocks 1018 and 1030 can be recovered or not may be determined on the basis of a data state of the data block 1014. If the data block 1014 has not been allocated to a user, then recoverability indications of the data blocks 1018 and 1030 may be set to "unallocated." If data in the data block 1014 is normal and does not need to be rebuilt, then recoverability indications of the data blocks 1018 and 1030 may be set to "recoverable." If data in the data block 1014 is abnormal and needs to be rebuilt, then recoverability indications of the data blocks 1018 and 1030 may be set to "unrecoverable." Based on the above described recovery method, corresponding recovery operation may be performed to the data blocks 1018 and 1030 respectively.

FIG. 10B schematically shows a block diagram 1000B of a technical solution for managing a triple-parity storage system according to an example implementation of the present disclosure. For the purpose of brevity, FIG. 10B shows only one stripe in the storage system, the stripe including data blocks 1010, 1012, 1014, 1016, 1018, 1030 and 1030B. In this stripe, the data blocks 1010, 1012, 1014 and 1016 are used for storing data D00, D01, D02 and D03 respectively, and the data blocks 1018, 1030 and 1030B are used for storing parity P0, Q0 and R0 respectively.

Suppose a storage device where the data block 1014 resides is being rebuilt, and it is also found storage devices where the data blocks 1018, 1030 and 1030B fail. At this point, whether data in the data blocks 1018, 1030 and 1030B can be recovered or not may be determined on the basis of a data state of the data block 1014. If the data block 1014 has not been allocated to a user, then recoverability indications of the data blocks 1018, 1030 and 1030B may be set to "unallocated." If data in the data block 1014 is normal and does not need to be rebuilt, then recoverability indications of the data blocks 1018, 1030 and 1030B may be set to "recoverable." If data in the data block 1014 is abnormal and needs to be rebuilt, then recoverability indications of the data blocks 1018, 1030 and 1030B may be set to "unrecoverable." Based on the above described recovery method, corresponding recovery operation may be performed to the data blocks 1018, 1030 and 1030B respectively.

According to an example implementation of the present disclosure, there is provided an apparatus for managing a storage system. The apparatus includes: one or more processors; a memory coupled to at least one processor of the one or more processors; computer program instructions stored in the memory which, when executed by the at least one processor, cause the apparatus to execute a method for managing a storage system. In the method, a first storage device that is in rebuilding state may be determined from a group of storage devices. Then, it may be detected whether a second storage device in the group of storage devices fails or not. If the second storage device fails, then a recoverability indication indicating whether a data block in the second storage device, which corresponds to a target data block in the first storage device, is recoverable or not may be obtained on the basis of a data state of the target data block. Subsequently, data in the data block in the second storage device corresponding to the target data block may be recovered on the basis of the recoverability indication.

According to an example implementation of the present disclosure, the data state may include an allocation state, the allocation state here indicating whether the target data block has been allocated to a user of the storage system or not.

According to an example implementation of the present disclosure, if the allocation state indicates the target data block has not been allocated, then the recoverability indication may be set to "unallocated."

According to an example implementation of the present disclosure, if the recoverability indication is set to "unallocated," predefined data may be written to the data block in the second storage device corresponding to the target data block, so as to indicate the data block has not been allocated.

According to an example implementation of the present disclosure, the data state may include an associated state, the associated state here indicating whether data in the target data block needs to be rebuilt or not.

According to an example implementation of the present disclosure, if the allocation state indicates the target data block has been allocated, then the recoverability indication may be determined on the basis of the associated state.

According to an example implementation of the present disclosure, the first storage device includes metadata, the metadata indicating whether an extent among multiple extents in the first storage device needs to be rebuilt or not.

According to an example implementation of the present disclosure, the recoverability indication may be determined on the basis of the metadata.

According to an example implementation of the present disclosure, if the target data block is unreadable, the recoverability indication may be set to "unrecoverable."

According to an example implementation of the present disclosure, if a recovery mark indicates "recoverable," then data in the data block in the second storage device corresponding to the target data block may be recovered on the basis of data in the target data block and data in a data block in the group of storage devices, which corresponds to the target data block.

According to an example implementation of the present disclosure, if the recovery mark indicates "unrecoverable," then predefined data may be written to data in the data block in the second storage device corresponding to the target data block, so as to indicate data in the data block is unrecoverable.

According to an example implementation of the present disclosure, a further recoverability indication indicating whether a data block in the second storage device, which corresponds to a further target data block in the first storage device, is recoverable or not may be determined on the basis of a data state of the further target data block.

According to an example implementation of the present disclosure, data in the data block in the second storage device corresponding to the further target data block may be recovered on the basis of the further recoverability indication.

According to an example implementation of the present disclosure, the target data block and the further target data block may be added to a first group.

According to an example implementation of the present disclosure, a target data block which has not been allocated to a user of the storage system may be removed from the first group.

According to an example implementation of the present disclosure, at least one portion of the first group may be moved to a second group, so that a recoverability indication of a target data block in the first group differs from a recoverability indication of a target data block in the second group.

According to an example implementation of the present disclosure, data in data blocks in the second storage device, which correspond to the target data block and the further target data block respectively, may be recovered on the basis of the first group and the second group.

According to an example implementation of the present disclosure, there is provided a computer program product tangibly stored on a non-transient computer readable medium and including machine executable instructions for executing actions of a method according to the present disclosure.

According to an example implementation of the present disclosure, there is provided a computer readable storage medium. The computer readable storage medium has computer readable program instructions stored therein, which, when executed by a processing unit of a machine, cause the machine to implement a method described above.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method for managing a storage system, the storage system comprising a group of storage devices, the method comprising:
    determining from the group of storage devices a first storage device which is in a rebuilding state;
    in response to a second storage device in the group of storage devices failing, obtaining a recoverability indication indicating whether a data block in the second storage device, which corresponds to a target data block in the first storage device, is recoverable or not on the basis of a data state of the target data block; and
    recovering data in the data block in the second storage device corresponding to the target data block on the basis of the recoverability indication;
    wherein the data state comprises an allocation state, the allocation state indicating whether the target data block has been allocated to a user of the storage system or not, and the obtaining a recoverability indication comprises:
        in response to the allocation state indicating the target data block has not been allocated, setting the recoverability indication to "unallocated".

2. The method according to claim 1, wherein the recovering data comprises:
    in response to the recoverability indication being set to "unallocated," writing predefined data to the data block in the second storage device corresponding to the target data block, so as to indicate the data block has not been allocated.

3. The method according to claim 1, wherein the data state comprises an associated state, the associated state indicating whether data in the target data block needs to be rebuilt or not, and the obtaining a recoverability indication comprises:
    in response to the allocation state indicating the target data block has been allocated, determining the recoverability indication on the basis of the associated state.

4. The method according to claim 3, wherein the first storage device comprises metadata, the metadata indicating whether an extent among multiple extents in the first storage device needs to be rebuilt or not, and the method further comprises: determining the recoverability indication on the basis of the metadata.

5. The method according to claim 1, further comprising:
    in response to another target data block being unreadable, setting another recoverability indication to "unrecoverable".

6. The method according to claim 1, further comprising:
    in response to a recovery mark indicating "recoverable," recovering data in another data block in the second storage device corresponding to another target data block on the basis of data in the another target data block and data in a data block in the group of storage devices, which corresponds to the another target data block.

7. The method according to claim 1, further comprising:
    in response to a recovery mark indicating "unrecoverable," writing predefined data to another data block in the second storage device corresponding to another target data block, so as to indicate data in the another data block is unrecoverable.

8. The method according to claim 1, further comprising:
    determining a further recoverability indication indicating whether a data block in the second storage device, which corresponds to a further target data block in the first storage device, is recoverable or not on the basis of a data state of the further target data block; and
    recovering data in the data block in the second storage device corresponding to the further target data block on the basis of the further recoverability indication.

9. The method according to claim 8, further comprising:
    adding the target data block and the further target data block to a first group;
    removing from the first group at least one data block which has not been allocated to a user of the storage system;
    moving at least one portion of the first group to a second group, so that a recoverability indication of a first data block in the first group differs from a recoverability indication of a second data block in the second group; and recovering data in data blocks in the second storage device, which correspond to the target data block and the further target data block respectively, on the basis of the first group and the second group.

10. An apparatus for managing a storage system, comprising:
a set of processors; and
a memory coupled to the set of processors, the memory storing computer program instructions which, when executed by the set of processors, cause the apparatus to execute a method for managing the storage system, the method comprising:
determining from the group of storage devices a first storage device which is in a rebuilding state,
in response to a second storage device in the group of storage devices failing, obtaining a recoverability indication indicating whether a data block in the second storage device, which corresponds to a target data block in the first storage device, is recoverable or not on the basis of a data state of the target data block, and
recovering data in the data block in the second storage device corresponding to the target data block on the basis of the recoverability indication,
wherein the data state comprises an allocation state, the allocation state indicating whether the target data block has been allocated to a user of the storage system or not, and the obtaining a recoverability indication comprises:
in response to the allocation state indicating the target data block has not been allocated, setting the recoverability indication to "unallocated".

11. The apparatus according to claim 10, wherein the recovering data comprises:
in response to the recoverability indication being set to "unallocated," writing predefined data to the data block in the second storage device corresponding to the target data block, so as to indicate the data block has not been allocated.

12. The apparatus according to claim 10, wherein the data state comprises an associated state, the associated state indicating whether data in the target data block needs to be rebuilt or not, and the obtaining a recoverability indication comprises:
in response to the allocation state indicating the target data block has been allocated, determining the recoverability indication on the basis of the associated state.

13. The apparatus according to claim 12, wherein the first storage device comprises metadata, the metadata indicating whether an extent among multiple extents in the first storage device needs to be rebuilt or not, and the method further comprises: determining the recoverability indication on the basis of the metadata.

14. The apparatus according to claim 10, wherein the method further comprises:
in response to another target data block being unreadable, setting another recoverability indication to "unrecoverable".

15. The apparatus according to claim 10, wherein the method further comprises:
in response to a recovery mark indicating "recoverable," recovering data in another data block in the second storage device corresponding to another target data block on the basis of data in the another target data block and data in a data block in the group of storage devices, which corresponds to the another target data block.

16. The apparatus according to claim 10, wherein the method further comprises:
in response to a recovery mark indicating "unrecoverable," writing predefined data to another data block in the second storage device corresponding to another target data block, so as to indicate data in the another data block is unrecoverable.

17. The apparatus according to claim 10, wherein the method further comprises:
determining a further recoverability indication indicating whether a data block in the second storage device, which corresponds to a further target data block in the first storage device, is recoverable or not on the basis of a data state of the further target data block; and
recovering data in the data block in the second storage device corresponding to the further target data block on the basis of the further recoverability indication.

18. The apparatus according to claim 17, wherein the method further comprises:
adding the target data block and the further target data block to a first group;
removing from the first group at least one data block which has not been allocated to a user of the storage system;
moving at least one portion of the first group to a second group, so that a recoverability indication of a first data block in the first group differs from a recoverability indication of a second data block in the second group; and
recovering data in data blocks in the second storage device, which correspond to the target data block and the further target data block respectively, on the basis of the first group and the second group.

19. A computer program product having a non-transitory computer readable medium which stores a set of instructions for managing a storage system that includes a group of storage devices[H] the set of instructions, when carried out by computerized circuitry, causing the computerized circuitry to perform a method of:
determining from the group of storage devices a first storage device which is in a rebuilding state;
in response to a second storage device in the group of storage devices failing, obtaining a recoverability indication indicating whether a data block in the second storage device, which corresponds to a target data block in the first storage device, is recoverable or not on the basis of a data state of the target data block; and
recovering data in the data block in the second storage device corresponding to the target data block on the basis of the recoverability indication;
wherein the data state comprises an allocation state, the allocation state indicating whether the target data block has been allocated to a user of the storage system or not, and the obtaining a recoverability indication comprises:
in response to the allocation state indicating the target data block has not been allocated, setting the recoverability indication to "unallocated".

20. A method for managing a storage system, the storage system comprising a group of storage devices, the method comprising:
determining from the group of storage devices a first storage device which is in a rebuilding state;
in response to a second storage device in the group of storage devices failing, obtaining a recoverability indication indicating whether a data block in the second storage device, which corresponds to a target data block in the first storage device, is recoverable or not on the basis of a data state of the target data block;

recovering data in the data block in the second storage device corresponding to the target data block on the basis of the recoverability indication; and in response to a recovery mark indicating "unrecoverable", writing predefined data to the data block in the second storage device corresponding to the target data block, so as to indicate data in the data block is unrecoverable.

21. The method according to claim 20, further comprising:

in response to the target data block being unreadable, setting the recoverability indication to "unrecoverable".

* * * * *

UNITED STATES PATENT AND TRADEMARK OFFICE
CERTIFICATE OF CORRECTION

PATENT NO. : 10,942,826 B2  Page 1 of 1
APPLICATION NO. : 16/247983
DATED : March 9, 2021
INVENTOR(S) : Sheng Wang et al.

It is certified that error appears in the above-identified patent and that said Letters Patent is hereby corrected as shown below:

In the Claims

Claim 19, Column 18, Line 40, reads "storage devices [H] the set of instructions, when carried out" should read --storage devices, the set of instructions, when carried out--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*